United States Patent
Chaplinski

[15] 3,658,200
[45] Apr. 25, 1972

[54] SNOWMOBILE TRAILER

[72] Inventor: Charles A. Chaplinski, Middle River, Minn. 56737

[22] Filed: May 6, 1970

[21] Appl. No.: 35,023

[52] U.S. Cl. ..........................214/373, 280/400, 214/390, 214/506
[51] Int. Cl. ...........................................................B62d 53/00
[58] Field of Search ..................280/400; 214/373, 506, 390

[56] References Cited

UNITED STATES PATENTS

| | | | |
|---|---|---|---|
| 2,870,928 | 1/1959 | Haggard et al. | 214/373 |
| 2,782,947 | 2/1957 | Linsel | 214/373 |
| 2,748,962 | 6/1956 | Murray | 214/373 |
| 2,714,461 | 8/1955 | Walker | 214/373 |
| 3,149,738 | 9/1964 | Bombardier | 214/506 |
| 3,437,354 | 4/1969 | Hetteen | 280/415 |

*Primary Examiner*—Leo Friaglia
*Attorney*—Williamson, Palmatier & Bains

[57] ABSTRACT

A snowmobile trailer has a wheeled supporting frame which is of a U-shaped configuration to straddle the snowmobile body in loading. The frame is swingable, preferably on the axis of a pair of aligned wheels, and has main supporting pads on the outer (rear) ends of the U-frame disposed beyond the axis of swinging and adapted to underlie and support the bottom of the forward part of the body when first tilted downward and then lifted upwardly somewhat. The sides of the frame disposed forwardly of the swinging axis carry adjustable inwardly disposed hold-down members for contacting and applying pressure to longitudinal running board elements on the sides of the snowmobile when the frame is further tilted backwardly from the loading position. Lastly the yoke at the middle of the U-stem (draft connection) has an upstanding fastener which is connected to the draft or trailer element at the rear of the snowmobile, such connection being tensioned by pulling up on the rear of the body.

4 Claims, 3 Drawing Figures

Patented April 25, 1972

3,658,200

INVENTOR.
CHARLES A. CHAPLINSKI
BY
Williamson Palmatier + Bains
ATTORNEYS

SNOWMOBILE TRAILER

This invention relates to snowmobile trailers for use behind an automotive vehicle.

The very wide and diversified use of snowmobiles by sportsmen and farmers throughout the northern states of the United States has brought about a real need for a compact efficient trailer to transport snowmobiles to locations where the use thereof is permitted by law and where sufficient snow is available for use. The structure, body-shapes, and functional mechanism of the many types of snowmobiles are such that conventional boat trailers, tractor trailers and the like cannot be successfully applied to snowmobiles.

Typical snowmobile characteristics which had to be taken into consideration in the successful conception of a compact trailer, which would not interfere with the good driving of an automobile or the like on which the device is trailed, constituted the quite forward disposition of the center of gravity of the overall snowmobile; the location and powering of the central driving track and the swingable mountings of the two ski frames and skis, all of which inherently are essential to the proper propulsion and travel of snowmobiles over snow, and other terrain, such as grassy plains where such devices are used.

While several prior art snowmobile trailers have been produced, the lack of strong support of the portion of the trailer below the center of gravity of the snowmobile, awkwardness in travel of the trailer behind the towing vehicle, insecure and inadequate attachment of the snowmobile to the trailer and flapping and displacement of the swiveled snowmobile skis during travel have been responsible for at least partial failures in the prior art structure. Furthermore, the structures of the prior art for the most part are built for one particular manufacture of snowmobiles and could not be readily adjusted to properly secure to and support snowmobiles of most of the prevalant current manufacturers.

It is the main object of my invention to provide a compact, inexpensive but very rugged trailer for snowmobiles, which can be readily tilted by one operator and which will clamp the snowmobile and secure the same upon the trailer frame in a new and most efficient manner.

A further object of my invention is the provision of a snowmobile trailer employing preferably only two supporting wheels which will ride behind the towing vehicle smoothly and efficiently and which, through its inherent construction, is usable and will accommodate snowmobiles of substantially all known present makes through an adjustment of a minimum number of parts.

More specifically, it is an object to provide a trailer of the class described wherein the body of the snowmobile and its weight is supported directly beneath the center of gravity of the mass and whereby lateral displacement of the snowmobile from the trailer is prevented, as well as an effective clamping action applied downwardly against longitudinal flanges, such as a running board of the snowmobile body.

The foregoing and other objects will be more apparent from the following description made in connection with the accompanying drawings, wherein like reference characters refer to similar parts throughout the several views and in which.

The embodiment of my snowmobile trailer illustrated employs an elongate generally U-shaped frame F constructed, if desired, of substantially rigid integral material, such as heavy metal tubular or I-beam material. The frame, as shown, is shaped to form a rather narrow forward portion 5 constituting the base of the U-shape centrally of which is mounted a heavy reinforcing platform 6 for attachment of a heavy short hitch bar 7 having an upstanding hitch element 7a for conventional attachment with a suitable coupling made fast to the rear central portion of an automotive vehicle. The two arms F—1 of frame F diverge gradually from front to rear of the trailer and have parallel upwardly angled rear extensions F—2 which are spaced apart a distance somewhat greater than the maximum width of conventional snowmobile bodies now in current use. The extensions F—2 of the frame just below and forward of their angular portions rigidly carry outstanding stationary axles A upon which conventional tired support wheels W are freely mounted for revolution. Protective fenders P, as shown, may be applied over the uppermost portions of the wheels W and are suitably attached by brackets to the rear frame portions F—2.

Figure 1:
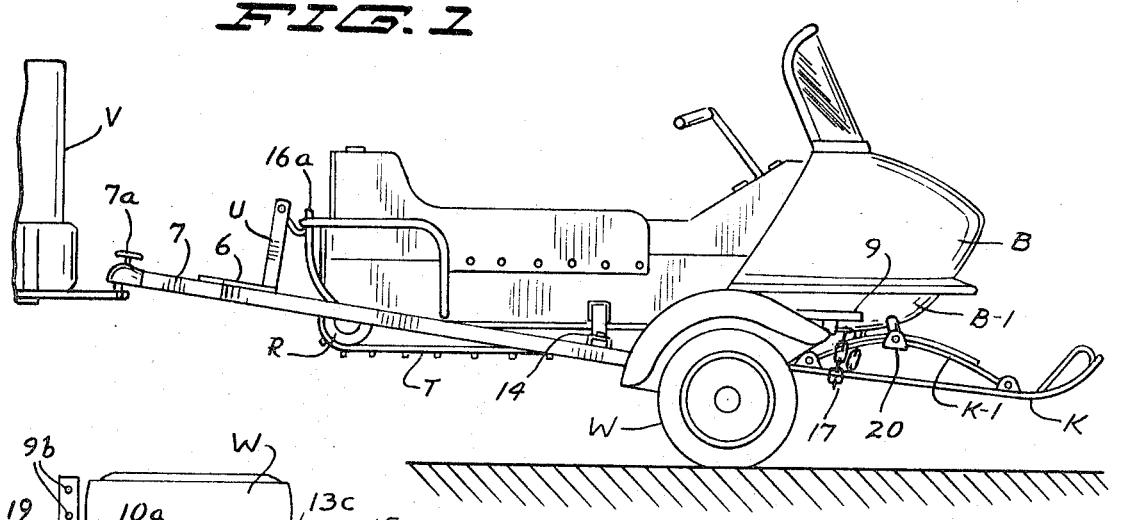
FIG. 1 is a side elevation of an embodiment of my device having secured thereto and in position for travel a conventional-type of snowmobile.
Figure 2:
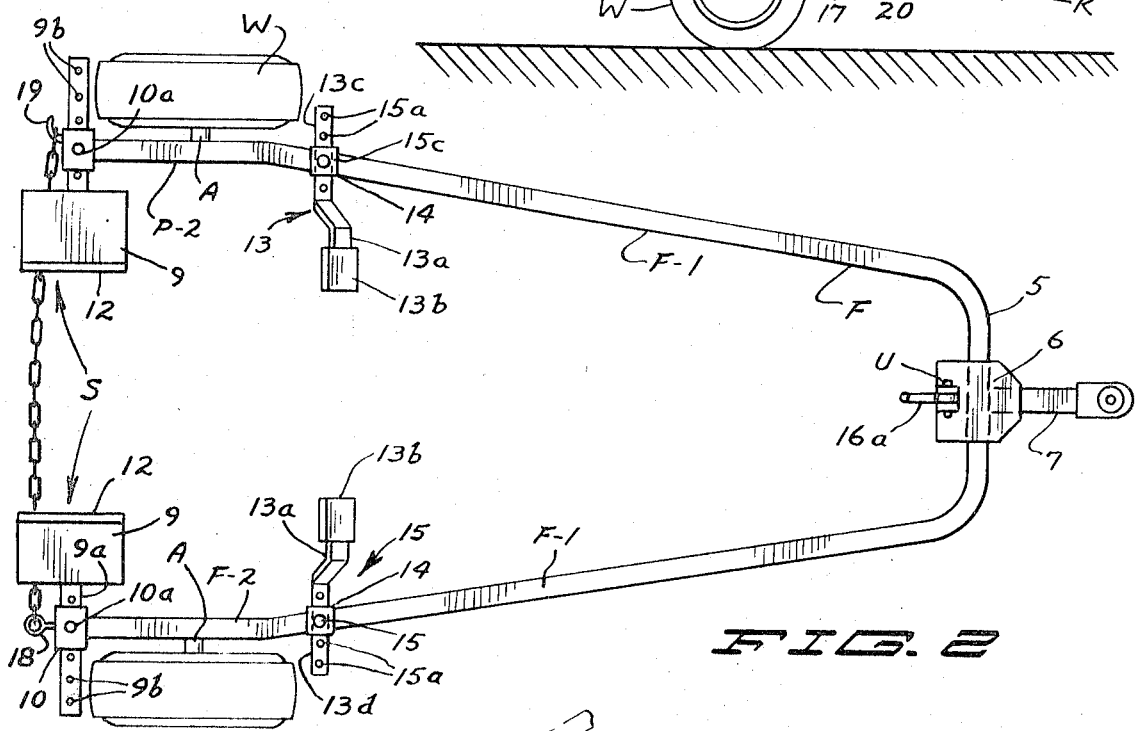
FIG. 2 is a plan view of said trailer with the snowmobile detached.

Extending inwardly and horizontally from the two extremity portions of the rear frame extensions F—2, I provide a pair of opposed and aligned support elements, indicated as an entirety by the letter S, and constituting flat pads 9, the upper surfaces of which are preferably of somewhat compressible material, said pads being transversely affixed to ends of rigid horizontal shanks 9a which are slidably and adjustably mounted in heavy square sleeves 10. Said sleeves 10 are welded or otherwise rigidly affixed transversely of the extremities of the frame extensions F—2. For retaining the two supports S in a variety of adjusted positions, the rectangular sleeves 10 are provided with bolt-retaining apertures 10a in the top and bottom portions thereof through which retaining bolts 11 may pass after passing through a series of apertures 9b spaced apart throughout the lengths of the shanks 9a. The cushioned pads 9, when adjusted in proper spaced relation, underlie and support the forward portion of the snowmobile body as clearly shown in FIG. 1. In such position, considering the angulated extension F—2 of the two sides of the frame, the weight of the snowmobile is borne largely by these heavy supports S and the connection of the extensions F—2 with the stub axles A of the trailer is such that the center of gravity of the entire weight of the snowmobile is disposed approximately above the stub axles A.

The inner ends or edges of support pads S are upturned to form retaining flanges 12 which, in the support of the forward heavy portion of the snowmobile, are hooked under and engage the conventional side rails of the frame upon which the track T of the snowmobile is distended and supported.

A pair of "hold-down" elements, indicated as entireties by the letter H, are mounted in opposed and horizontally aligned relation adjustably connected with the sides F—1 of the frame a short distance forwardly of the periphery of wheels W. As shown, each of the hold-down members comprises a shank 13 having upper horizontal portion 13a upon which is affixed a rigid (as shown) square sleeve member 13b, preferably having an exterior surface of somewhat compressible material for engaging against the longitudinal running board or flange R at one or the other sides of the snowmobile body and near the bottom thereof. Shank 13 is downturned and preferably curved to form an intermediate portion 13b, which at its lower end is connected with a lower horizontal stem 13c which is adjustably anchored in a mounting sleeve 14 of rectangular shape provided with a vertical removable anchoring bolt 15 which may pass through any one of a number of adjustment apertures 15a formed through the foot 13c of the respective holding member. The hold-down members H may thus be spaced the appropriate distances apart and in relation to the frame F to overlie and engage the relatively wide flanges R of the running boards of snowmobiles varying in body widths considerably and certainly within the range of widths now provided by current snowmobile products.

A rigid upstanding post U is secured at its base to the top of the platform 6 and at its upper end has a means, such as the hook 15, for adjustably retaining one or more links of a support chain 16 which has a hook at its lower end adapted to engage and secure the drawbar or hitch 17 conventionally provided at the rear of a snowmobile and disposed centrally and in slight spaced relation to the body thereof.

Preferably with my trailer structure I provide a restraint medium for preventing flapping of the snowmobile skis during trailer travel. To this end and as an embodiment of same, I provide a chain X which is disposed transversely of the front of the snowmobile and threaded between the apex portions of the rear of the skis K and their support relief springs K—1. One end of chain X is secured to an eye 18 mounted on one of the upstanding angle frame extensions F—2 and the other end of the chain is adjustably connected with a hook 19 on the opposite frame section F—2.

OPERATION

The functioning of the essential components of my trailer and their combinative interlocking relation with certain of the conventional parts of snowmobiles is exceedingly important and brings about new and improved results; both in the loading of the snowmobile and in the retension of the load during subsequent travel.

In loading the snowmobile, the spaced supports S and intermediate hold-down members are of course first adjusted as to space relation to cooperate with the previously designated portions of the snowmobile body.

Figure 3:
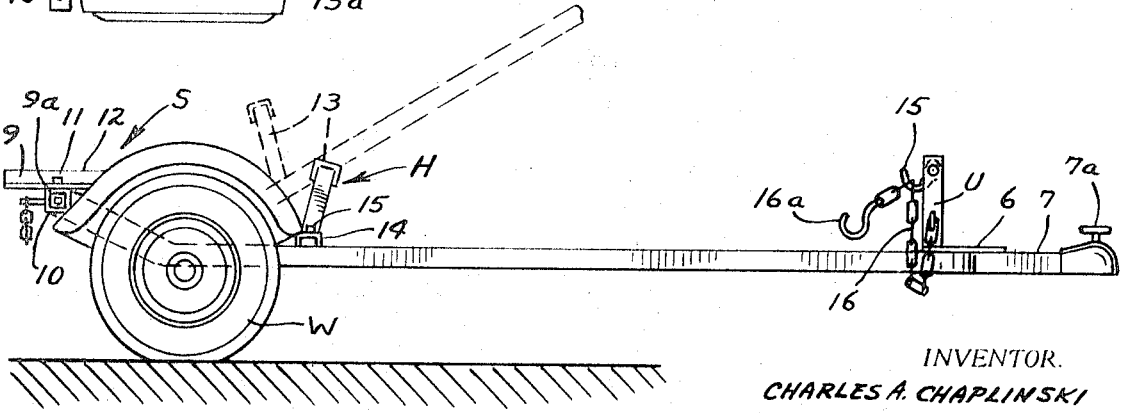
FIG. 3 is a side elevation of my trailer with the main parts of the frame shown in full lines in horizontal position and showing the frame and its rear extension and rear support members in initial loading position in heavy dotted lines.

The entire frame F is then tilted rear end downwardly, as shown in the dotted lines in FIG. 3, behind the snowmobile with the arms F—1 of the frames straddling the snowmobile and the trailer is then manually backed up around the back of the snowmobile with the main support members S at their tips being only a few inches from the ground. In straddling position the trailer frame is backed until the supports S engage the underside of the forward streamlined bottom portion of the body and thereafter pressure is placed upon the hitch portion of the frame F to elevate the snowmobile with the supporting pads disposed just forwardly of the center of gravity of the entire snowmobile.

Thereafter the frame is further tilted up raising to some extent the rear main support end thereof and causing the two spaced hold-down members to contact with pressure, the intermediate portions of the snowmobile running boards.

With such hold-down pressure applied, the tongue or hitch end of the frame is supported at an intermediate portion by any suitable means and the rear portion of the snowmobile body is lifted as from the drawbar means 17 thereby putting tension on the metal or somewhat resilient sides of the U frame and also putting tension upon the body because of contact with the hold-down members H. The chain 16 which carries the hook 16a is engaged with the drawbar member 17 and upward pressure is applied to the snowmobile body to tension the chain and connect the same with the hook 15 provided at the top of the upstanding post U.

In this position it will be seen that the snowmobile body, as well as the frame, are under a certain amount of tension which is very excellent for retaining purposes and permitting resiliency in the subsequent travel of the loaded snowmobile over the road.

Finally, in loading the snowmobile, the chain X is threaded through the apex portions at the rear of the skis and their supporting leaf springs.

From the foregoing description it will be seen that combinatively a new and improved result in loading a snowmobile, requiring only the services of one operator, has been accomplished where under support means in combination with a straddling U-shaped frame, and overhanging hold-down means with a third uplifting means (at the rear of the snowmobile body) resiliently and under tension secures snowmobiles of varying widths, sizes and shapes to the simple trailer structure.

It will further be seen that great ease of loading is accomplished through the straddling U-shaped frame which, when tilted, disposes the main supports against the curved underside of the forward portion of the body without requiring manual or other lifting of the body for initial placement on the trailer.

What is claimed is:

1. A trailer for snowmobiles of the type which have the following conventional components, to wit, an elongate hull-like body having longitudinal outturned running boards at the sides and having a cross-sectionally convex forward bottom, a pair of parallel skis swivelly mounted for steering at the sides of said bottom, a propulsion powered track extending from the rear of said skis to approximately the rear of said body and supported by a generally horizontal track frame, and a central draft connection means at the rear of said body, said trailer having in combination:

an elongate frame of generally U-shape structure having the base portion of the U disposed forwardly with a draft hitch element secured thereto and having longitudinal side portions spaced apart to straddle the widths of conventional snowmobiles, said frame being mounted and swingable upon a pair of spaced wheels revolvable on a transverse axis disposed adjacent the rear end of said U-shaped frame, a pair of horizontally aligned main support pads affixed to the rear portions of said frame sides somewhat rearwardly of said wheels and extending substantially inwardly thereof for engaging the convex forward bottom of said body when the frame is tilted to a position with its rear end close to the ground, a pair of opposed substantially horizontal hold-down and tensioning means affixed respectively to the sides of said frame and extending inwardly thereof and disposed forwardly of said wheel axis for engagement with and above said outturned running boards supplied by the snowmobile when said frame is tilted towards horizontal position from its initial downturned position for engagement with the convex bottom of said body, and an anchoring and tensioning medium including an element affixed to the forward portion of said frame for interlocking with a second element connected centrally with the rear of said body for upward lifting of said body relative to said frame and anchoring of said body in such lifted position thereby also tensioning said frame and said body with said body positioned substantially above original ground-supported position.

2. The structure set forth in claim 1, an elongate restraining medium for disposal in transverse position under the front of said snowmobile and engaging the rear portions of the skis thereof, and means at the ends of said frame sides for tautly anchoring the ends of said restraining medium to prevent said skis from swinging during travel of the loaded snowmobile.

3. The structure and combination set forth in claim 1 wherein, said inwardly extending support pads are mounted for lateral adjustment upon the sides of said frame for accommodating snowmobiles having hull-shaped bodies of varying widths.

4. The structure and combination set forth in claim 1 wherein, said hold-down and tensioning means are adjustably affixed to the sides of said frame for lateral adjustment relative thereto and are also offset upwardly from said frame sides.

* * * * *